US010728635B2

(12) United States Patent
Hoffmann et al.

(10) Patent No.: US 10,728,635 B2
(45) Date of Patent: *Jul. 28, 2020

(54) SYSTEMS AND METHODS FOR COMMUNICATING SIGNALING OVER AN OPTICAL DISTRIBUTED ANTENNA SYSTEM

(71) Applicant: Andrew Wireless Systems GmbH, Buchdorf (DE)

(72) Inventors: Jaroslav Hoffmann, Donauwörth (DE); Peter Starek, Donauwoerth (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,161

(22) Filed: Jun. 25, 2019

(65) Prior Publication Data
US 2019/0313170 A1    Oct. 10, 2019

Related U.S. Application Data

(63) Continuation of application No. 15/903,643, filed on Feb. 23, 2018, now Pat. No. 10,382,847.
(Continued)

(51) Int. Cl.
*H04J 14/00* (2006.01)
*H04Q 11/00* (2006.01)
(Continued)

(52) U.S. Cl.
CPC .......... *H04Q 11/0067* (2013.01); *H04B 1/40* (2013.01); *H04B 10/2503* (2013.01);
(Continued)

(58) Field of Classification Search
CPC .................. H04Q 11/0067; H04B 1/40; H04B 10/25753; H04B 10/2503;
(Continued)

(56) References Cited

U.S. PATENT DOCUMENTS

2010/0190519 A1   7/2010   Zavadsky et al.
2011/0135308 A1   6/2011   Tarlazzi et al.
(Continued)

FOREIGN PATENT DOCUMENTS

WO    2012075137 A1    6/2012

OTHER PUBLICATIONS

International Searching Authority, "International Search Report and Written Opinion from PCT Application PCT/EP2018/059958 dated Aug. 11, 2018", from Foreign Counterpart to U.S. Appl. No. 15/903,643, pp. 1-18, Published: WO.
(Continued)

*Primary Examiner* — Don N Vo
(74) *Attorney, Agent, or Firm* — Fogg & Powers LLC

(57) ABSTRACT

In one embodiment, a distributed antenna system comprises: a master unit configured to receive a base station downlink radio frequency signal and to transmit a base station uplink radio frequency signal; and at least one remote antenna unit that is communicatively coupled to the master unit using at least one cable, the remote antenna unit configured to radiate a remote downlink radio frequency signal and to receive a remote uplink radio frequency signal; wherein the master unit comprises: a controller; and a respective interface to couple the controller to a first operator control panel; wherein the at least one remote antenna unit comprises: a controller; and a respective interface to couple the controller to a second operator control panel; wherein the master unit controller and the remote unit controller synchronize at least some information between the first and second operator control panels over the at least one cable.

20 Claims, 9 Drawing Sheets

Related U.S. Application Data

(60) Provisional application No. 62/489,252, filed on Apr. 24, 2017.

(51) Int. Cl.

| | | |
|---|---|---|
| *H04B 10/2575* | (2013.01) | |
| *H04W 56/00* | (2009.01) | |
| *H04B 10/25* | (2013.01) | |
| *H04W 16/28* | (2009.01) | |
| *H04B 1/40* | (2015.01) | |
| *H01Q 3/00* | (2006.01) | |
| *H04W 88/08* | (2009.01) | |
| *H04B 7/024* | (2017.01) | |

(52) U.S. Cl.
CPC . *H04B 10/25753* (2013.01); *H04B 10/25758* (2013.01); *H04W 16/28* (2013.01); *H04W 56/001* (2013.01); *H01Q 3/005* (2013.01); *H04B 7/024* (2013.01); *H04W 88/085* (2013.01)

(58) Field of Classification Search
CPC . H04B 10/25758; H04B 7/024; H04W 16/28; H04W 56/001; H04W 88/085; H01Q 3/005

USPC .................................. 398/45; 375/211, 220
See application file for complete search history.

(56) References Cited

U.S. PATENT DOCUMENTS

| | | |
|---|---|---|
| 2011/0201368 A1 | 8/2011 | Faccin et al. |
| 2011/0243201 A1 | 10/2011 | Phillips et al. |
| 2013/0201916 A1 | 8/2013 | Kummetz et al. |
| 2016/0277253 A1* | 9/2016 | Uyehara ............. H04W 88/085 |
| 2017/0222869 A1 | 8/2017 | Guo et al. |
| 2018/0310080 A1 | 10/2018 | Hoffmann et al. |
| 2018/0324621 A1* | 11/2018 | Thangarasa ......... H04W 56/001 |

OTHER PUBLICATIONS

International Searching Authority, "Invitation to Pay Additional Fees from PCT Application No. PCT/EP2018/059958 dated Jul. 18, 2018", from Foreign Counterpart to U.S. Appl. No. 15/903,643, pp. 1-11, Published: WO.

U.S. Patent and Trademark Office, "Notice of Allowance", U.S. Appl. No. 15/903,643, dated Apr. 8, 2019, pp. 1-9, Published: US.

U.S. Patent and Trademark Office, "Office Action", U.S. Appl. No. 15/903,643, dated Oct. 15, 2018, pp. 1-14, Published: US.

* cited by examiner

SYSTEMS AND METHODS FOR COMMUNICATING SIGNALING OVER AN OPTICAL DISTRIBUTED ANTENNA SYSTEM

CROSS-REFERENCE TO RELATED APPLICATIONS

This application is a U.S. Continuation Application claiming priority to, and the benefit of, U.S. patent application Ser. No. 15/903,643, titled "SYSTEMS AND METHODS FOR COMMUNICATING SIGNALING OVER AN OPTICAL DISTRIBUTED ANTENNA SYSTEM" filed on Feb. 23, 2018, which claims priority to, and the benefit of, U.S. Provisional Patent Application No. 62/489,252, titled "SYSTEMS AND METHODS FOR COMMUNICATING SIGNALING OVER AN OPTICAL DISTRIBUTED ANTENNA SYSTEM" filed on Apr. 24, 2017, and which are each incorporated herein by reference.

BACKGROUND

A Distributed Antenna System (DAS) typically includes one or more master units that are communicatively coupled with a plurality of remote antenna units, where each remote antenna unit can be coupled directly to one or more of the master units or indirectly via one or more other remote antenna units and/or via one or more intermediary or expansion units. A DAS is typically used to improve the coverage provided by one or more base stations that are coupled to the master units. These base stations can be coupled to the master units via one or more cables or via a wireless connection, for example, using one or more donor antennas. The wireless service provided by the base stations can included commercial cellular service and/or private or public safety wireless communications.

In such a safety application, the safety wireless capacity provided by the DAS and the associated base-station-related equipment during normal operations may not be sufficient in emergency situations (such as a fire or security event) due to the presence of many additional users of the safety wireless service. As a result, it is common to provision a DAS used for such safety applications with additional base-station-related and DAS equipment (base stations, repeaters, etc.) that operate in a standby mode during normal operations but can be activated in emergency situations in order to provide increased safety wireless service capacity when necessary. To enable an operator to determine the status of the DAS and the base-station related equipment and activate and deactivate standby equipment, operator control panels (OCPs) can be deployed in several locations associated with the DAS. Each OCP can include operator input and output components (such as buttons, switches, light emitting diodes (LEDs), liquid crystal displays (LCDs), and the like) for receiving from and providing to an operator information about the DAS and the base-station-related equipment. In some facilities, OCPs may be located at major entrances to the associated site, such as a building or underground tunnel. Other OCPs may be positioned at other locations, such as near designated emergency access points.

Typically, the several OCPs communicate with each other and with a management entity via a separate, dedicated OCP network (OCPN) that is implemented using cabling that is entirely separate from the cabling in the DAS used for communicating the safety wireless service traffic. Such a dedicated OCPN is typically implemented using copper cables so that both power and signaling communications can be provided to the OCPs over the cables of the OCPN. Installing dedicated OCPN cabling for such purposes, however, requires an additional investment when deploying such a DAS.

SUMMARY

In one embodiment, a distributed antenna system comprises: a master unit configured to receive a base station downlink radio frequency signal and to transmit a base station uplink radio frequency signal; and at least one remote antenna unit that is communicatively coupled to the master unit using at least one cable, the remote antenna unit configured to radiate a remote downlink radio frequency signal from at least one antenna associated with the remote antenna unit and to receive a remote uplink radio frequency signal from at least one antenna associated with the remote antenna unit; wherein the master unit comprises: a master unit controller; and a respective interface to couple the master unit controller to a first operator control panel; wherein the at least one remote antenna unit comprises: a remote unit controller; and a respective interface to couple the remote unit controller to a second operator control panel; wherein the master unit controller and the remote unit controller synchronize at least some information between the first operator control panel and the second operator control panel over the at least one cable.

DRAWINGS

In accordance with common practice, the various described features are not drawn to scale but are drawn to emphasize. Reference characters denote like elements throughout figures and text.

DETAILED DESCRIPTION

In the following detailed description, reference is made to the accompanying drawings that form a part hereof, and in which is shown by way of specific illustrative embodiments. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Some embodiments of the present disclosure implement an Operator Control Panel Network (OCPN) for the various Operator Control Panels (OCPs) to share status and setting information (SSI) using the cabling in a DAS that is otherwise used for communicating safety wireless service traffic between nodes of the DAS. As a result, the OCPN does not need to be implemented entirely using dedicated, separate cabling and the major cable runs (in terms of distance) can be implemented using the DAS cabling. More specifically, to enable this, a signal interface (SI) is provided by one or more nodes of the DAS. Moreover, synchronization of the OCPN SSI across multiple DAS domains can be achieved over the DAS cabling through a sequential communication process via a remote antenna unit (other DAS node) that spans the multiple DAS domains.

Generally, references to an "operator" in this document include both human operators (for example, people) and technical or virtual operators (for example, hardware and/or software entities that fully- or semi-autonomously interact with an OCP and/or interact with an OCP under the control of another remotely located operator).

Figure 1:
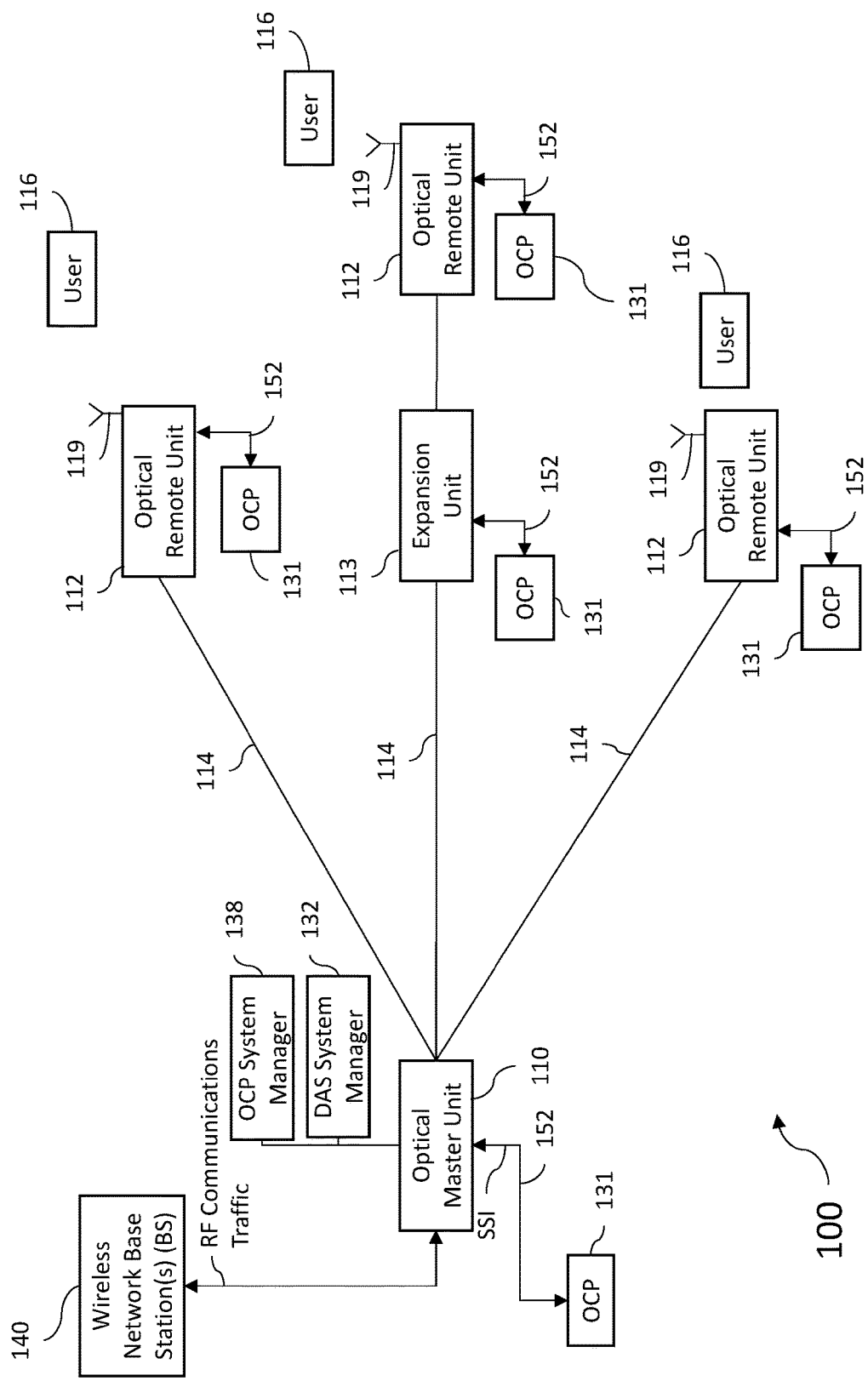
FIGS. 1, 1A, 1B and 1C are block diagrams illustrating a distributed antenna system of one embodiment of the present disclosure.

FIG. 1 is block diagram of one exemplary embodiment of a distributed antenna system (DAS) 100 that includes support for communicating status and setting information (SSI) for operator control panels (OCPs) 131.

The DAS 100 comprises one or more master units 110 that are communicatively coupled to one or more remote antenna units 112 via one or more cables 114. Each remote antenna unit 112 can be communicatively coupled directly to one or more of the master units 110 or indirectly via one or more other remote antenna units 112 and/or via one or more intermediary or expansion units 113.

Each master unit 110 is communicatively coupled to one or more base stations 140. One or more of the base stations 140 can be co-located with the respective master units 110 to which it is coupled (for example, where the base station 140 is dedicated to providing base station capacity to the system 100 and is coupled to the respective master units 110). Also, one or more of the base stations 140 can be located remotely from the respective master units 110 to which it is coupled (for example, where the base station 140 provides base station capacity to an area beyond the coverage area of the DAS 100). In this latter case, the master unit 110 can be coupled to a donor antenna and repeater or bi-directional amplifier in order to wirelessly communicate with the remotely located base station 140.

In this exemplary embodiment, the base stations 140 include one or more base stations that are used to provide public and/or private safety wireless services (for example, wireless communications used by emergency services organizations (such as police, fire and emergency medical services) to prevent or respond to incidents that harm or endanger persons or property). Such base stations are also referred to here as "safety wireless service base stations" or "safety base stations." The base stations 140 also can include, in addition to safety base stations, one or more base stations that are used to provide commercial cellular wireless service. Such base stations are also referred to here as "commercial wireless service base stations" or "commercial base stations."

The base stations 140 can be coupled to the master units 110 using a network of attenuators, combiners, splitters, amplifiers, filters, cross-connects, etc., (sometimes referred to collectively as a "point-of-interface" or "POI"). This network can be included in the master units 110 and/or can be separate from the master units 110. This is done so that, in the downlink, the desired set of RF channels output by the base stations 140 can be extracted, combined, and routed to the appropriate master units 110, and so that, in the upstream, the desired set of carriers output by the master units 110 can be extracted, combined, and routed to the appropriate interface of each base station 140. It is to be understood, however, that this is one example and that other embodiments can be implemented in other ways.

Figure 1B:
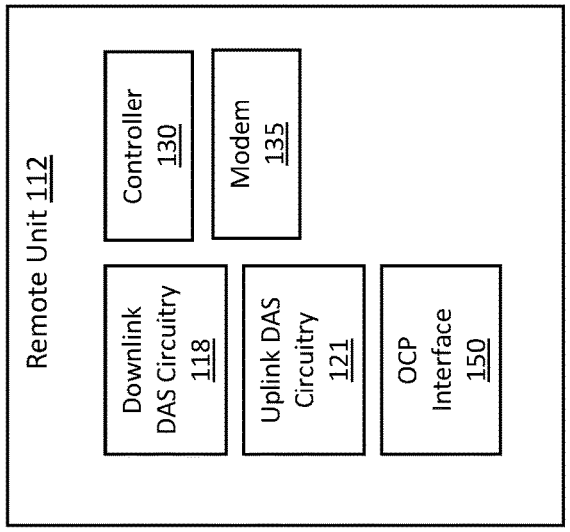
Figure 1A:
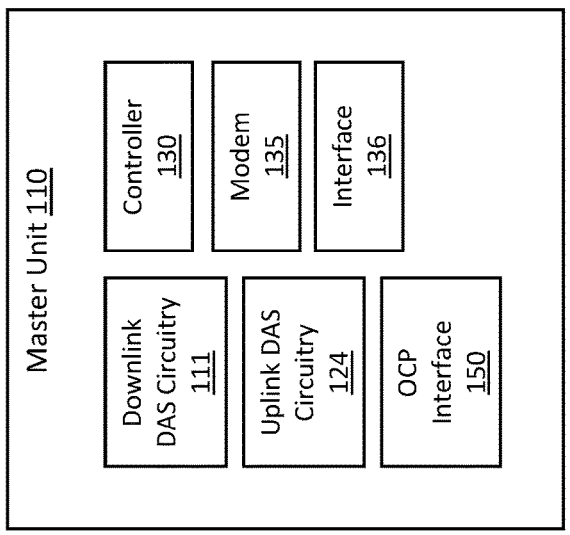

As shown in FIG. 1A, in general, each master unit 110 comprises downlink DAS circuitry 111 that is configured to receive one or more downlink signals from one or more base stations 140. These signals are also referred to here as "base station downlink signals." Each base station downlink signal includes one or more radio frequency channels used for communicating in the downlink direction with user equipment 116 over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol).

The downlink DAS circuitry 111 in each master unit 110 is also configured to generate one or more downlink transport signals derived from one or more base station downlink signals and to transmit one or more downlink transport signals to one or more of the remote antenna units 112.

As shown in FIG. 1B, each remote antenna unit 112 comprises downlink DAS circuitry 118 that is configured to receive the downlink transport signals transmitted to it from one or more master units 110 and to use the received downlink transport signals to generate one or more downlink radio frequency signals that are radiated from one or more antennas 119 associated with that remote antenna unit 112 for reception by user equipment 116. These downlink radio frequency signals are analog radio frequency signals and are also referred to here as "remote downlink radio frequency signals." Each remote downlink radio frequency signal includes one or more of the downlink radio frequency channels used for communicating with user equipment 116 over the wireless air interface. In this way, the DAS 100 increases the coverage area for the downlink capacity provided by the base stations 140.

Also, each remote antenna unit 112 comprises uplink DAS circuitry 121 that is configured to receive via antenna 119 one or more uplink radio frequency signals transmitted from the user equipment 116. These signals are analog radio frequency signals and are also referred to here as "remote uplink radio frequency signals." Each uplink radio frequency signal includes one or more radio frequency channels used for communicating in the uplink direction with user equipment 116 over the relevant wireless air interface.

The uplink DAS circuitry 121 in each remote antenna unit 112 is also configured to generate one or more uplink transport signals derived from the one or more remote uplink radio frequency signals and to transmit one or more uplink transport signals to one or more of the master units 110.

Each master unit 110 comprises uplink DAS circuitry 124 that is configured to receive the respective uplink transport signals transmitted to it from one or more remote antenna units 112 and to use the received uplink transport signals to generate one or more base station uplink radio frequency signals that are provided to the one or more base stations 140 associated with that master unit 110. Typically, this involves, among other things, combining or summing uplink signals received from multiple remote antenna units 112 in order to produce the base station signal provided to each base station 140.

Each base station uplink signal includes one or more of the uplink radio frequency channels used for communicating with user equipment 116 over the wireless air interface. In this way, the DAS 100 increases the coverage area for the uplink capacity provided by the base stations 140.

Figure 1C:
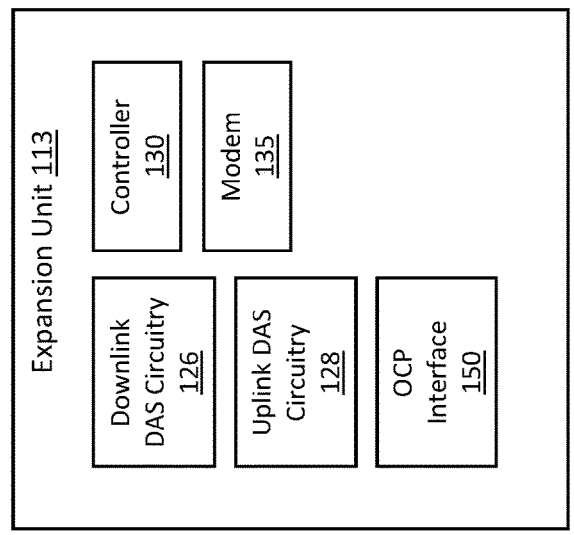

As shown in FIG. 1C, each intermediary unit 113 comprises downlink DAS circuitry 126 that is configured to receive the downlink transport signals transmitted to it from the master unit 110 (or other intermediary unit 113) and transmits the downlink transport signals to one or more remote antenna units 112 or other downstream intermediary units 113. Each intermediary unit 113 comprises uplink DAS circuitry 128 that is configured to receive the respective uplink transport signals transmitted to it from one or more remote antenna units 112 or other downstream intermediary units 113, combine or sum the received uplink transport signals, and transmit the combined uplink transport signals upstream to the master unit 110 or other intermediary unit 113.

In other embodiments, one or more remote antenna units 112 are coupled to one or more master units 110 via one or more other remote antenna units 112 (for examples, where the remote antenna units 112 are coupled together in a daisy chain or ring topology). In such an embodiments, an intermediary unit 113 may be implemented using a remote antenna units 112.

The downlink DAS circuitry 111, 118, and 126 and uplink DAS circuitry 124, 121, and 128 in each master unit 110, remote antenna unit 112, and intermediary unit 113, respectively, can comprise one or more appropriate connectors, attenuators, combiners, splitters, amplifiers, filters, duplexers, analog-to-digital converters, digital-to-analog converters, mixers, field-programmable gate arrays (FPGAs), microprocessors, transceivers, framers, etc., to implement the features described above. Also, the downlink DAS circuitry 111, 118, and 126 and uplink DAS circuitry 124, 121, and 128 may share common circuitry and/or components. For example, some components (such as duplexers) by their nature are shared among the downlink DAS circuitry 111, 118, and 126 and uplink DAS circuitry 124, 122, and 128.

The DAS 100 can use either digital transport, analog transport, or combinations of digital and analog transport for generating and communicating the transport signals between the master units 110, the remote antenna units 112, and any intermediary units 113. For the purposes of illustration, some of the embodiments described here are implemented using analog transport over optical cables. However, it is to be understood that other embodiments can be implemented in other ways, for example, in DASs that use other types of analog transport (for example, using other types of cable and/or using analog transport that makes use of frequency shifting), digital transport (for example, where digital samples indicative of the analog base station radio frequency signals and analog remote radio frequency signals are generated and communicated between the master units 110 and the remote antenna units 112), or combinations of analog and digital transport.

Each unit 110, 112, 113 in the DAS 100 also comprises a respective controller 130. The controller 130 is implemented using one or more programmable processors that execute software that is configured to implement the various features described here as being implemented by the controller 130.

The controller 130 (the various features described here as being implemented by the controller 130) (or portions thereof) can be implemented in other ways (for example, in a field programmable gate array (FPGA), application specific integrated circuit (ASIC), etc.).

Each controller 130 is configured to monitor and control the operation of the associated unit. Each controller 130 is also configured to send and receive management data over the DAS 100. In one embodiment, each unit 110, 112, 113 in the DAS 100 also comprises a modem 135 that is configured to send and receive management data over the DAS 100 by modulating and demodulating one or more carrier frequencies that are used for the purpose of communicating management data. In some embodiments (for example, where digital transport is used in the DAS), a separate modem 135 for modulating and demodulating management data is not used and, instead, the management data is combined with the digital DAS transport data before being supplied to the transport transceiver or other physical layer device.

In the exemplary embodiment shown in FIG. 1, each master unit 110 includes an Ethernet interface 136 (or other interface) that can be used to communicatively couple the controller 130 in that master unit 110 to a DAS system manager 137 and to an OCP system manager 138 (for example, over a Ethernet and/or Internet Protocol (IP) network). The DAS system manager 137 is typically implemented as software executing on a computer that a user can access in order to monitor and configure the DAS 100.

The OCP system manager 138 is also typically implemented as software executing on a computer that a user can access in order to monitor and configure various items of safety-base-station-related equipment that is deployed in order to provide safety wireless service.

One or more of the units 110, 112, 113 in the DAS 100 also comprise an interface 150 to couple the controller 130 in that unit 110, 112, 113 to an operator control panel 131 that is deployed near that unit 110, 112, 113. The interface 150 is therefore also referred to here as an "OCP interface 150." Each such unit 110, 112, 113 can include an appropriate connector to attach a cable 152 (also referred to here as an "OCP cable 152") that is used to couple the unit 110, 112, 113 to the OCP 131. In general, each OCP 131 can be connected to the nearest unit 110, 112, 113 of the DAS 110.

Each such unit 110, 112, 113 is configured to communicate information to and from the associated operator controller panel 102 over the respective OCP interface 150.

In one embodiment, the OCPs 131 can be used to monitor the status of the safety base stations 140 deployed at that site and/or related equipment used to couple the master units 110 to the safety base stations 140 (such as repeaters or bi-directional amplifiers). The OCPs 131 include appropriate user output devices (such as light-emitting diodes (LEDs), liquid crystal displays (LCDs), speakers, digital outputs, etc.) to display or otherwise present the status of such equipment to a user located near the OCP 131. Moreover, the OCPs 131 can also be used for monitoring of the status of an uninterruptable power supply (UPS) for example, at any of the either at the master unit 110, remote unit 112 or intermediary or expansion unit 113 sites), for monitoring of the status of any of the remote units 112 or intermediary or expansion units 113, or even for monitoring of the status of the complete DAS 100. For example, in some implementation, the OCPs 131 can also show the status of the radiating cables connecting the remote units 112 to their antenna 119 (which may be determined in some implementations by information from a cable supervision unit, CSU, at a remote unit 112). Thus, in circumstances where public safety responders might have no access to the master units, but have access to monitor and control the OCPs, annunciators (for example, light emitting diodes (LEDs)) at the OPCs 131 can provide a summary set of information to provide a clear picture of the DAS status needed for quick decision of how to proceed.

Also, the OCPs 131 can be used to activate or deactivate such equipment using user input devices (such as buttons, keypads, switches, digital inputs, etc.) included in the OCPs 131. This can be done, for example, to activate, in emergency situations, safety base station equipment that is normally operated in a standby mode.

The controller 130 can be configured to periodically poll (read) the status of the various user input devices included in the OCP 131. This can be done in order to determine when a user has provided input using that OCP 131 (for example, by pressing one or more buttons included in the OCP 131, changing the setting of a switch or dial included in the OCP 131, etc.). When such user input has been provided via the OCP 131, the user input is read by the controller 130 and can be communicated over the DAS 100 (and the cables 108 used in the DAS 100) to one or more other units 110, 112, or 113 of the DAS 100 (and the OCPs 131 coupled thereto) and/or to the OCP system manager 138.

This status and setting information (SSI) can be communicated over the DAS 100 in the same manner that the controller 130 communicates DAS management information (for example, using the modem 135).

In this way, such SSI can be communicated to the various OCPs 131 and the OCP system manager 138 without having to deploy a separate, dedicated OCPN.

In some embodiments, when such SSI is received at a unit 110, 112, 113, the associated controller 130 can be configured to change the state of one or more of the user output devices based on the received SSI (for example, by illuminating an LED, changing the color of an illuminated LED, blinking an LED, displaying a message on a LCD, etc.). This can be done to synchronize the state of the various OCPs 131 at a site.

Figure 2:
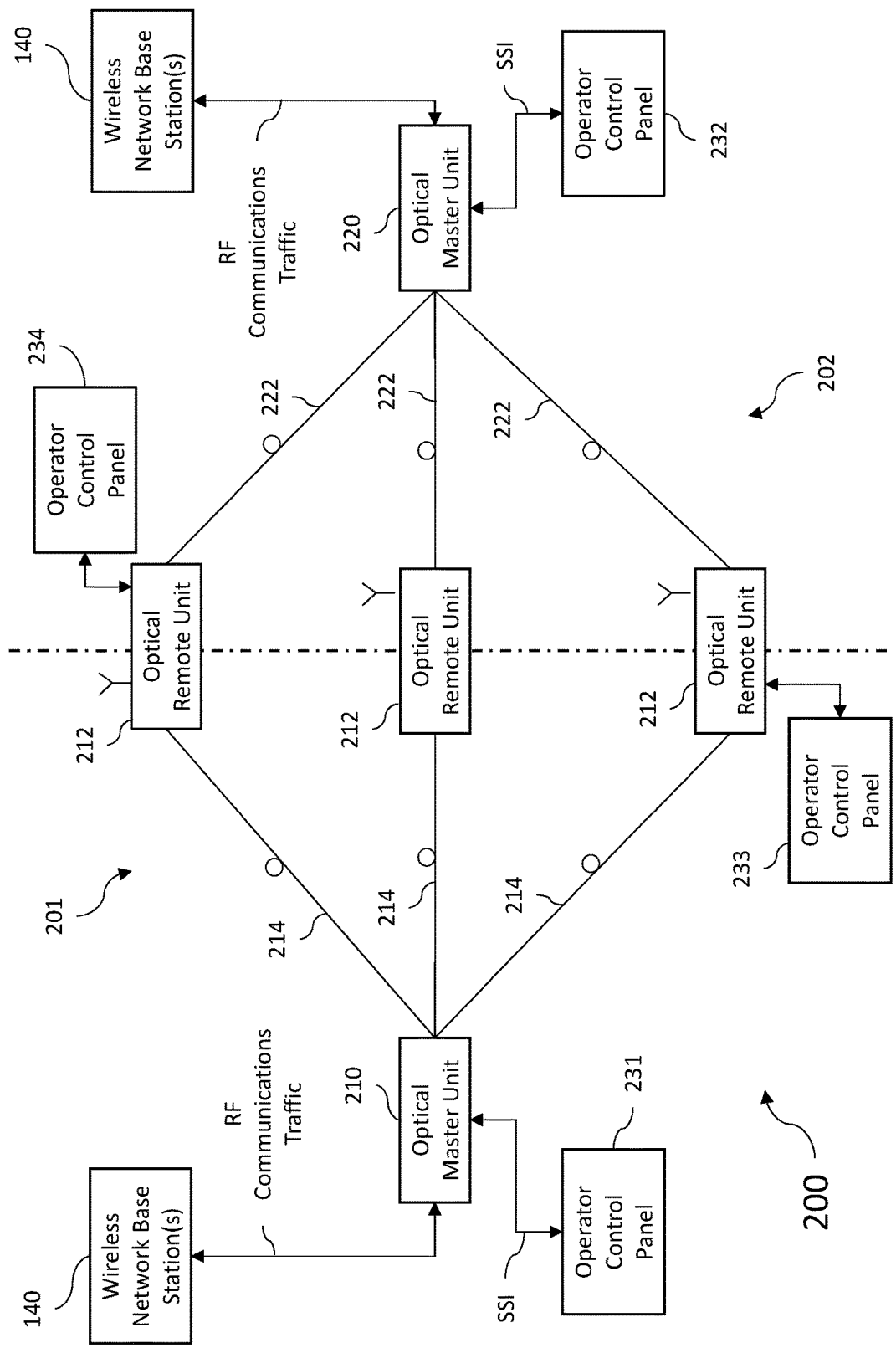
FIG. 2 is a block diagram illustrating another distributed antenna system of one embodiment of the present disclosure.

FIG. 2 is a block diagram illustrating another DAS of one embodiment of the present disclosure, particularly an Optical Distributed Antenna System (ODAS 200). ODAS 200 comprises a plurality of Optical Master Units (OMUs) which together with Optical Remote units (ORUs) to which they are coupled, each define an independently functioning ODAS domain. In the particular implementation shown in FIG. 2, ODAS 200 includes a first OMU 210 coupled to a plurality of ORUs 212 via a plurality of fiber optic communication links 214, which defines a first domain 201 of the ODAS 200. ODAS 200 also includes a second OMU 220 coupled to the same plurality of ORUs 212 via a plurality of fiber optic communication links 222, which defines a second domain 202 of the ODAS 200. Each of the first domain 201 and second domain 202 may function as a stand-alone DAS, in the same manner as DAS 100 described above with respect to FIG. 1. As such, the components and functions described above for the master units, remote units, operator control panels, and other elements described therein for FIG. 1 are applicable to the optical master units, optical remote units, operator control panels, and other elements described in FIGS. 2, 2A and 2B and subsequent figures discussed below. It should be understood that elements shown in ODAS 200 may be used in conjunction with, in combination with, or substituted for elements of any of the other embodiments described herein. Further, the functions, structures and other description of elements for such embodiments described above may apply to like named elements of ODAS 200 and vice versa.

As shown in FIG. 2, a first OCP 231 is connected to the first OMU 210 and a second OCP 232 is connected to the second OMU 220. The OCP are equipped with activation buttons, LEDs for displaying the system status and so on as described with respect to the OCP 131 of FIG. 1, and may be location at any entrance or access point of the concerned facility.

As described in greater detail below, the OMU 210 and 220 each include a signal interface (SI) through which OCPN SSI is synchronized between OCP 231 and 232 over the optical fiber cables 214, 222 of the ODAS 200. Optionally, in some embodiments, one or more of the ORU 212 may also be connected to an OCP (such as shown at 233 and 234) and each exchange OCPN SSI through their associated ORU 212 using a signal interface. The retrieval and/or forwarding of SSI data needed for operation of the OCPN is thus accomplished via the signal interfaces implemented in the OMUs (and optionally the ORUs) of the ODAS 200. In some embodiments, the OCP may also be optionally powered by the OMU or ORU to which they are connected. In other embodiments, they are powered from an independent source.

The OMU 210 and 220 are each coupled to one or more communication network Base Stations (BS) such as the network base stations 140. In some embodiments, the one or more base stations 140 in communication with OMU 210 are separate and independent from the one or more base stations 140 in communication with OMU 220. In other embodiments, OMU 210 and 220 are communicatively coupled to the same one or more base stations 140. Communications between the OMU 210 and 220 and the one or more base stations 140 may be provided through wired or wireless communication techniques and may be either direct links or indirect links such as through a repeater.

Figure 2A:
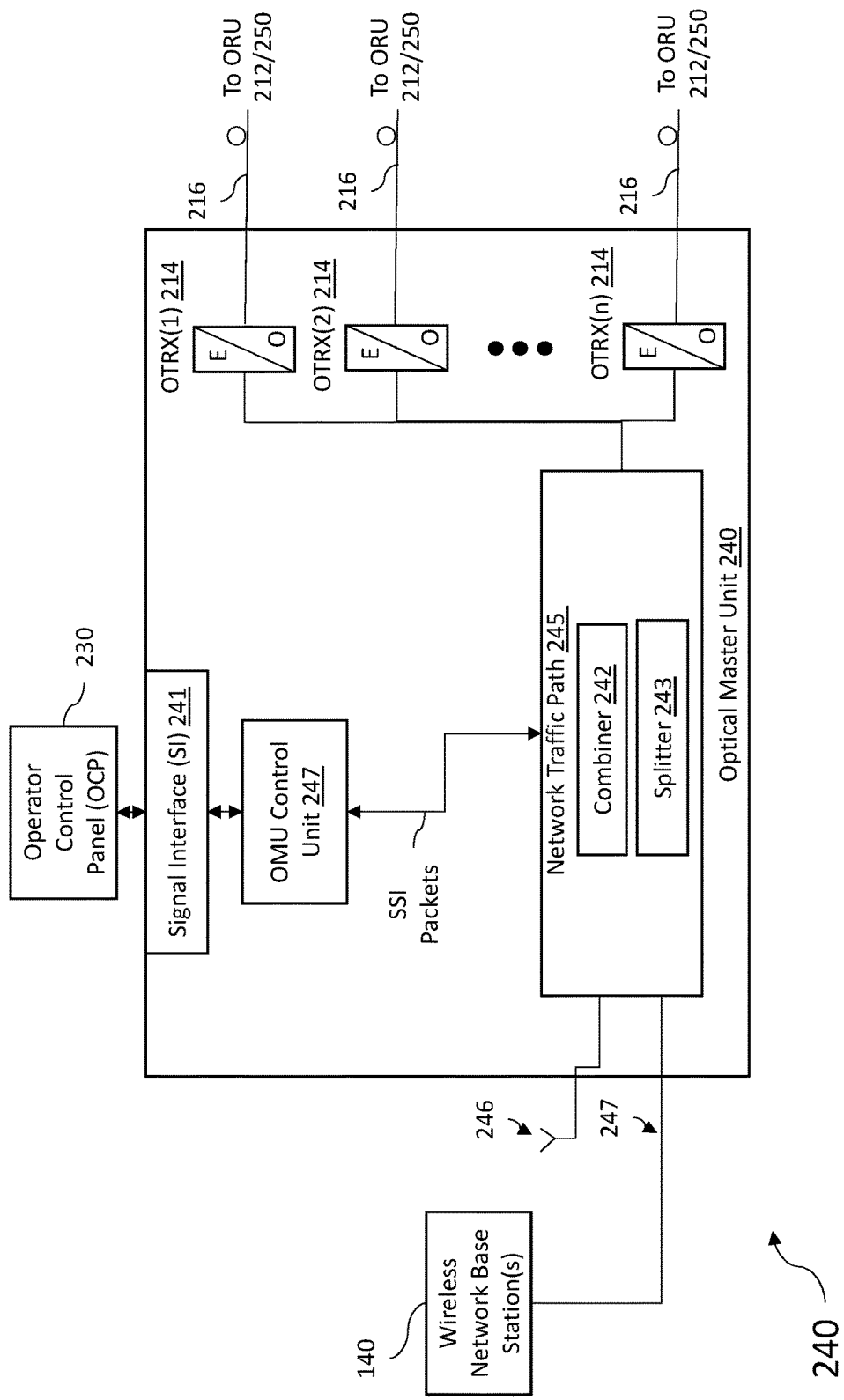
FIG. 2A is a block diagram illustrating an optical master unit of one embodiment of the present disclosure.

FIG. 2A is a simplified diagram illustrating an optical master unit (OMU) 240 of one embodiment of the present disclosure which may be used to implement the OMU 210, 220 of the ODAS 200 described in FIG. 2. OMU 240 comprises an OMU control unit (CU) 247 coupled to a signal interface (SI) 241, and further comprise a network traffic path 245 that may include an RF combiner 242 and an RF Splitter 243. OMU 240 further includes a plurality of optical interfaces (OTRX) 214 which convert electrical signals to optical signals in the downlink (DL) direction, and optical signals to electrical signals in the uplink (UL) direction. The CU 247 shown in FIG. 2A may be implemented using, for example, a microcontroller or microprocessor executing code that is embedded within, or otherwise in a memory accessible to, the controller to perform the functions of the CU 247 described herein. In some embodiments, the CU 247 may correspond to the one of the controllers 130 discussed above. In one embodiment, downlink RF signals are received at OMU 240 from a BS 140 via antennas 246 or coupled in directly via RF cables 247. The downlink RF signals may be combined at the combiner 242, split by splitter 243 and distributed to the plurality of optical interfaces (OTRX) 244, which convert the RF signals into optical signals to be distributed over optical fiber 216 to the ORU 212.

Figure 2B:
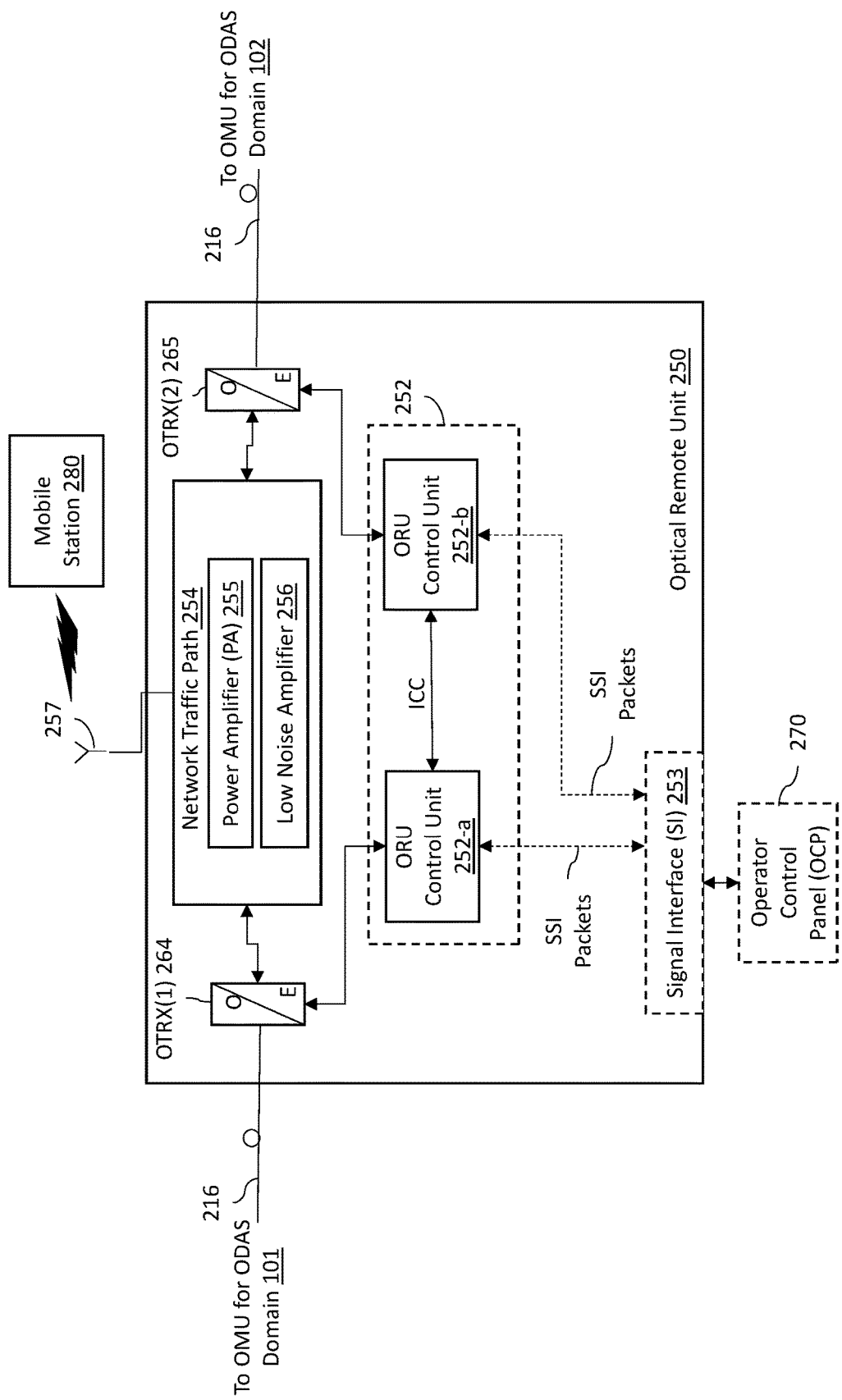
FIG. 2B is a block diagram illustrating an optical remote antenna unit of one embodiment of the present disclosure.

FIG. 2B is a simplified diagram illustrating an optical remote unit (ORU) 250 of one embodiment of the present disclosure which may be used to implement any one of the ORU 212 of the ODAS 200 described in FIG. 2 and operate in conjunction with the OMU 240 shown in FIG. 2A. In this particular embodiment, ORU 250 comprises an ORU control unit (CU) 252 (which may optionally be implemented using a first ORU CU 252-*a* and a second ORU CU 252-*b* that communicate with each other using bidirectional inter-control unit communication (ICC)). The CU 252, CU 252-*a* and/or CU 252-*b* may be implemented, for example, a microcontroller or microprocessor executing code embedded within or otherwise in a memory accessible to the controller to perform the functions of the CU described herein. In some embodiments, the CU 252 may correspond to one of the controllers 130 discussed above.

For implementations where ORU 250 supports an operator control panel (shown at 270) for use by public safety personnel, the CU 252 may be optionally coupled to signal interface (SI) 253 for communicating with the operational control panel 270. ORU 250 further comprises at least one optical interface (OTRX). In the implementation shown in FIG. 2B, ORU 250 comprises a first OTRX 264 for communicating via optical fiber with the OMU 210 for ODAS domain 201, and a second OTRX 265 for communicating via optical fiber with the OMU 220 for ODAS domain 202. A network traffic path 254 that includes a power amplifier (PA) 255, low noise amplifier (LNA) 256 and antenna 257, is coupled to the OTRX 264 and OTRX 265.

In one embodiment in operation, ORU 250 receives a DL optical signal over an optical fiber 216 from OMU 240 and an OTRX (either 264 or 265) converts the optical signal back into an RF signal, PA 255 amplifies the DL signal to a desired power level and feeds it into an antenna system 257 to radiate towards a user/mobile station 280.

Uplink (UL) RF signals are received from the mobile station 280 via the antennas 257 fed to the antenna port of the ORU 250. The ORU 250 separates this UL signal from the DL one, amplifies it by the LNA 256 and coverts it in an OTRX (either 264 or 265) to an optical signal distributed over the optical fiber 216 to an OMU 240. The connected OTRX 214 of the OMU 240 converts the optical signal received over the optical fiber 216 from the ORU 250 back into an RF signal, amplifies it to desired power level and feeds it back towards the BS 140.

With embodiments of the present disclosure, in order to synchronize SSI between the various OCP, the two distinct OMU 210, 220 of the ODAS 200 utilize one or more of the ORU 212 which are mutually coupled to both the first ODAS domain 201 and second ODAS domain 202 of the ODAS to forward the SSI between ODAS domains.

The OMU control unit 247 supervises not only the active parts and components of the OMU 240 but also the ORU 250 and its parts and components. This enables proper settings and optimized performance of the ODAS 200, alarming and diagnosis. The OMU control unit 247 has sequential connection to each ORU's control unit 252 via a communication channel transferred through the optical fiber 216. In the case of OCPN SSI, when this information is received at an ORU 250 via the communication channel from one ODAS 200 domain, it is forwarded on by the ORU control unit 252 to the other ODAS domain rather than radiated as an RF signal from its antenna 257.

For example, in FIG. 2A the signal interface 241 of the OMU 240 comprises a bidirectional signal interface with an OCP 230 and may correspond to the OCP Interface 150 discussed above. The signal interface 241 has a sufficient number of inputs and outputs to enable communication of all status and setting information (SSI) relevant to the functioning of the OCP 230 between the multiple OCPs in ODAS 200 that define the OCPN.

In one embodiment, the SSI is regularly retrieved from the OCP 230 and/or sent to the OCP 230 via signal interface 241 as directed by the control unit 247. For example, the control unit 247 may regularly poll the signal interface 241 to determine if any SSI within the OCP 230 has changed. The control unit 247 will also receive and process incoming SSI packets received over fiber optic cable 216 from an ORU 250. In that case, the control unit 247 may periodically generate an SSI packet that it sends to OCP 230 to synchronize the SSI on OCP 230 with the SSI of the other OCP for ODAS 200. It should be understood that SSI packets can represent any piece of information, starting from simple binary state information to complex data packet based data exchange. For example, a resulting SSI packet transferred between OCP may be assembled from multiple SSI packets received through an SI 241. In one embodiment, CU 247 may generate an SSI packet to provide to OCP 230 only if a certain number of SSI packets from certain ORUs have been received.

For implementations where an ORU 250 is configured with an OCP (such as shown at 270 in FIG. 2B), SSI for and from OCP 270 may be synchronized in the same manner as described above for OMU 240. That is, the signal interface 253 of the ORU 250 comprises a bidirectional signal interface with the OCP 270 having a sufficient number of inputs and outputs to enable communication of all SSI relevant to the functioning of the OCP 270 between the multiple OCPs of the OCPN. In some embodiments, the SI 253 may correspond to the OCP Interface 150 discussed above. The SSI may be regularly retrieved from OCP 270 and/or sent to OCP 270 via signal interface 253 as directed by the control unit 252 of the ORU 250. The control unit 252 may regularly poll the signal interface 253 to determine if any status or setting information from the OCP has changed. The control unit 252 will also receive and process SSI received from an OMU 240, and periodically generate an SSI packet to OCP 270 via the signal interface 253 to synchronize the SSI on OCP 270 with the SSI of the other OCP for ODAS 200. As with the OMU 240, SSI packets transferred between OCP may be assembled from multiple SSI packets communicated via the SI 253.

The OMU 240 control unit has regular connections (such as through regular polling) to all ORUs 250 connected to it through the optical fiber. The SSI from both the OMU SI 241 and the ORU SI 253 is synchronized during this regular connection, according the newest OCP entries and hardware (HW) and/or software (SW) status of the ODAS 200 and connected equipment.

Figure 2C:
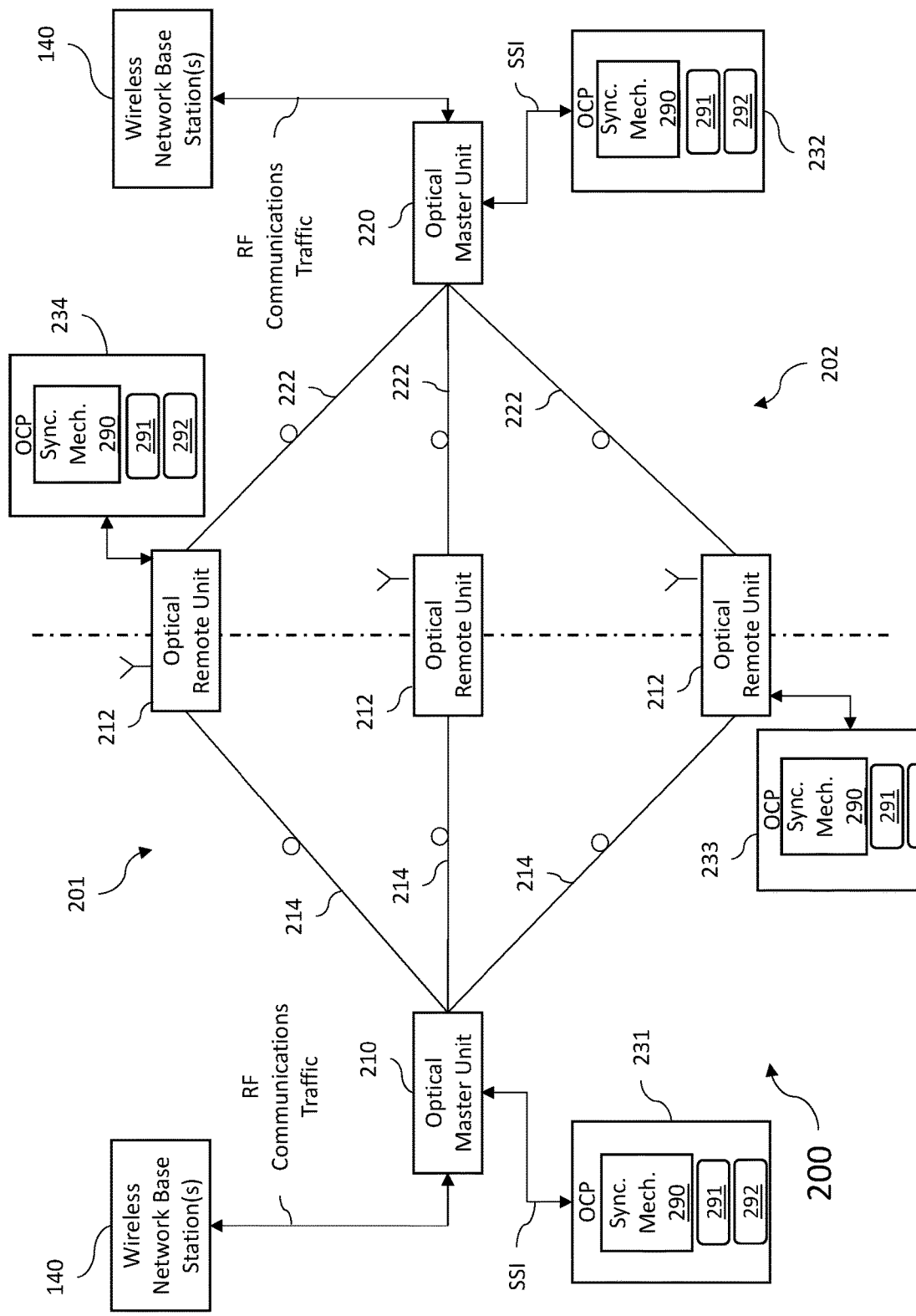
FIG. 2C is a block diagram illustrating additional features for a distributed antenna system of one embodiment of the present disclosure.

As shown in FIG. 2C, in some embodiments, each OCP (whether connected to a DAS through a master unit, remote antenna unit, or some other intermediary or expansion units as shown in any of the above figures) comprises a synchronization mechanism 290 which operates to prevent a previously released OCPN SSI packet from oscillating through the DAS network, as this may results in a failure condition. That is, it controls the flow of OCPN SSI packets transmitted from the OCP. For example, if a user of the OCP manually or automatically generates SSI packets at one or more of the OCP in quick succession such that that the period of SSI packet generation is shorter than the SSI packet propagation time across the DAS network, the OCP's could end up in a non-synchronized state resulting in a faulty synchronized OCPN. To address this concern, the above mentioned synchronization mechanism 290 can locally store SSI packets generated in a memory at the OCP so that no user input gets lost. The OCP synchronization mechanism 290 then ensures that SSI packets are released to the DAS network when the previously generated SSI packet has been properly received by all OCPs (meaning that the OCPN has reached a stable state). A timeout event may be generated by the synchronization mechanism 290 when synchronization is not completed within a set period of time. The synchronization mechanism 290 can be accomplished by various means, such as but not limited to a hardware implementation (for example, using logic gates, latches, flip-flops, delay elements, etc.) or a software implementation (for example running a code on an OCP processor) or preceding the OCP in the form of an electronic ballast.

One design consideration when interfacing an OCP to a master unit, remote antenna unit, or intermediary or expansion units, is to minimize the wiring effort towards the SI of the associated master unit, remote antenna unit, or intermediary or expansion units, such that they still have input and/or output lines free for other general purpose (for example, digital control inputs can not only be level controlled but also edge controlled to save additional input lines). For example, in the embodiment shown in FIG. 2C, one possible realization of an OCP comprises one pushbutton 291 for transitioning the OCP to an "ON"-state (and thus transition all OCPs participating in the network to their "ON"-state through synchronization) and one pushbutton 292 for transitioning the OCP to an "OFF"-state (and thus transition all OCPs participating in the network to their "OFF"-state through synchronization). Controlling the "ON"/"OFF" state of the OCPs may be configured to use just one digital input and one digital output at each OCP and this number is independent from the total number of OCPs participating in the network.

Figure 3:
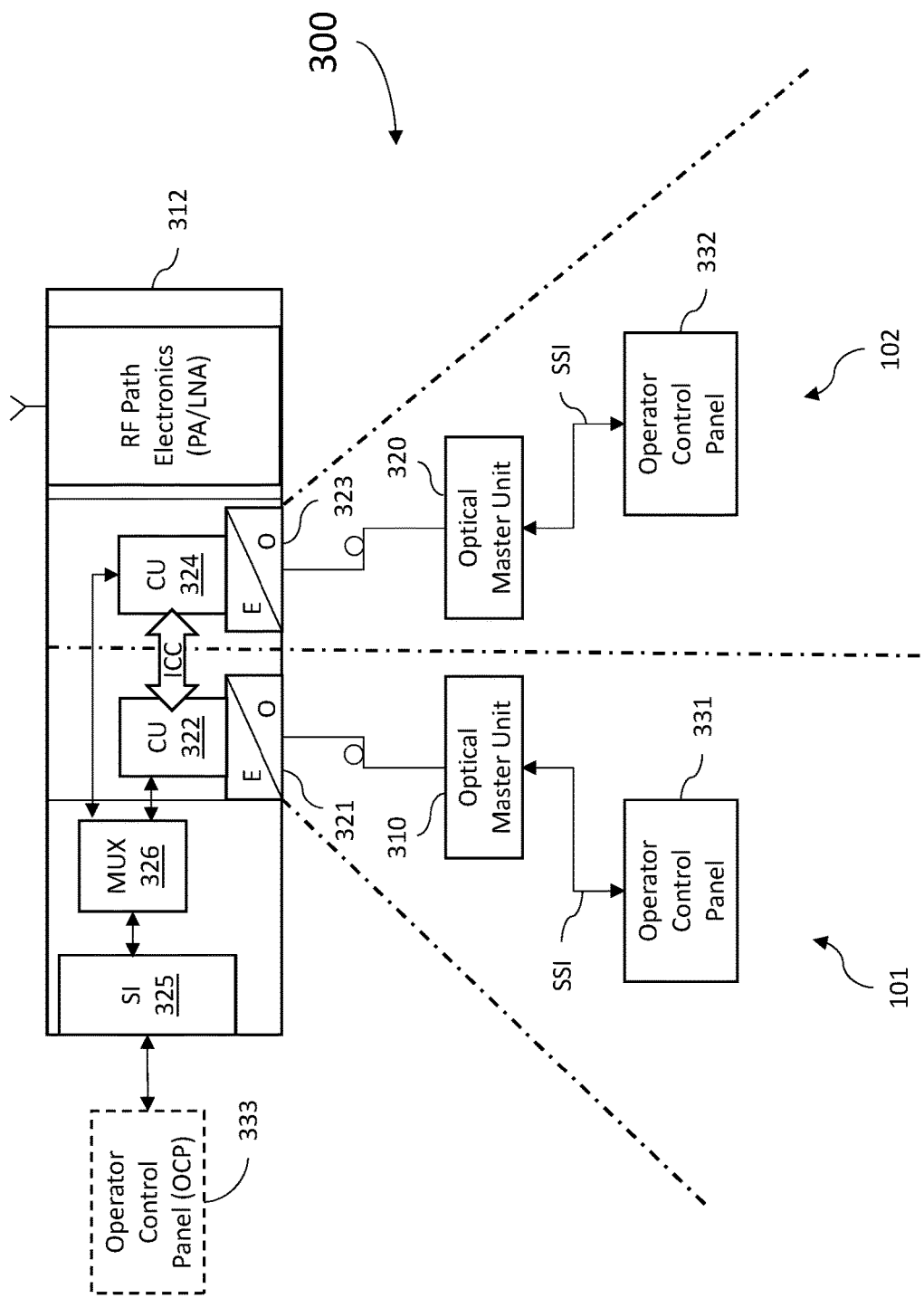
FIG. 3 is a block diagram illustrating an implementation of an optical distributed antenna system of one embodiment of the present disclosure.

FIG. 3 is block diagram of an ODAS 300 for illustrating operation of SSI synchronization between the OMU 310 and OMU 320 SSI synchronization is achieved via an ORU 312 having fiber optic connections to both OMU 310 and OMU 320. The OMU 310 and OMU 320 may correspond to the OMU 210 and OMU 220 of the ODAS 200 of FIG. 2 and OMU 240 of FIG. 2A. ORU 312 may corresponds to one of the OMU 212 of FIG. 2 and OMU 250 of FIG. 2B. In this example architecture, ORU 312 comprises two optical interfaces 321 and 323, controlled respectively by two control units 322 and 324 which can communicate with each other using bidirectional inter control unit communication (ICC). It should be understood that elements shown in FIGS. 3 and 3A may be used in conjunction with, in combination with, or substituted for elements of any of the other embodiments described herein. Further, the functions, structures and other description of elements for such embodiments described above may apply to like named elements of FIGS. 3 and 3A and vice versa.

Because the ORU 312 is connected by optical fiber to both OMUs 310 and 320, the control units 322 and 324 have a regular connection to the OMU control units of the respective OMUs 310 and 320. Thus SSI can be exchanged and communicated between the two OMUs 310 and 320 through a sequential communication process via the ORU 312. Because of the two distinct control units in the ORU 312, ORU 312 thus appears to the OMUs 310 and 320 as two independent ORUs, one within the first ODAS domain 201 (i.e., in communication with OMU 310) and one within the second ODAS domain 202 (i.e., in communication with OMU 320). As a result, OMU 310 is aware only of the ORU 312's connection to OMU 310 via interface 321. Similarly, OMU 320 is aware only of the ORU 312's connected to the OMU 320 via interface 323. Neither OMU 310 nor OMU 320 needs to be aware of the fact that ORU 312 is coupled to both OMU 310 and OMU 320 in order for SSI synchronization between OCPs of different ODAS domains to be achieved. Moreover, for purposes of this example, there no other means for exchanging data between OMU 310 and OMU 320 is presumed to exist at this hierarchical level.

The three OCPs 331, 332 and 333 illustrated in this example ODAS 300 are functionally equivalent, so that any change of SSI that occurs at one of the OCP will be synchronized with the other within the others so that public safety responders operating any one of the OCP is provided the same level of control and ODAS status awareness. As the OCPs 331, 332 and 333 might be located within the facility at positions far away from each other, SSI synchronization is accomplished automatically without any need for operator intervention to initiate synchronization.

For example, in one embodiment in operation an operator at OCP 331 initiates generation of an SSI packet (for example, by pressing a button on the OCP 331) that is communicated to the OMU 310 through the SI that connects OCP 331 with OMU 310. From this action, the following information flow for SSI synchronization is automatically initiated. The OMU 310 will, for example through routine polling techniques, recognize the SSI change in OCP 331. The OMU 310 may optionally confirm and/or update the SSI change in OCP 331 through a feedback channel in the SI, and then forward an SSI packet to the first control unit 322 at ORU 312. The first control unit 322 at ORU 312 will forward the SSI packet to the second control unit 324 of ORU 312 via ICC. OMU 320, which is in communication with CU 324, will recognize that an SSI change occurred at the ORU 312 (again, for example through routine polling techniques) and forward this information to the OCP 332 connected to the OMU 312 through its SI.

For the case where the ORU 312 is optionally connected to its own associated OCP 333 through an SI 325, the control unit 322 at the ORU 312 will update the SSI of OCP 332 through the SI 326. In this particular example, control unit 322 will generate the SSI packet to send to OCP 333 because it was the control unit that initially received the SSI packets from OMU 310. However in alternate implementations, either of the control units 322 or 324 may generate the SSI packet to send to OCP 333 regardless as to which initially received the SSI packets from an OMU. In one embodiment, the control units 322 or 324 communicate with SI 325 via a MUX 326 which coordinates and routes communications between the SI 325 and the control units 322 or 324.

After execution of the steps above all OCPs in this examiner ODAS 300 will have their SSI synchronized to the same values, namely those of OCP 331 which initiated the synchronization sequence. In this way, a transparent communication channel between the OMU 310 of ODAS domain 201 and the OMU 320 of the independent ODAS domain 202 (and vice versa) will have been established.

Figure 4:
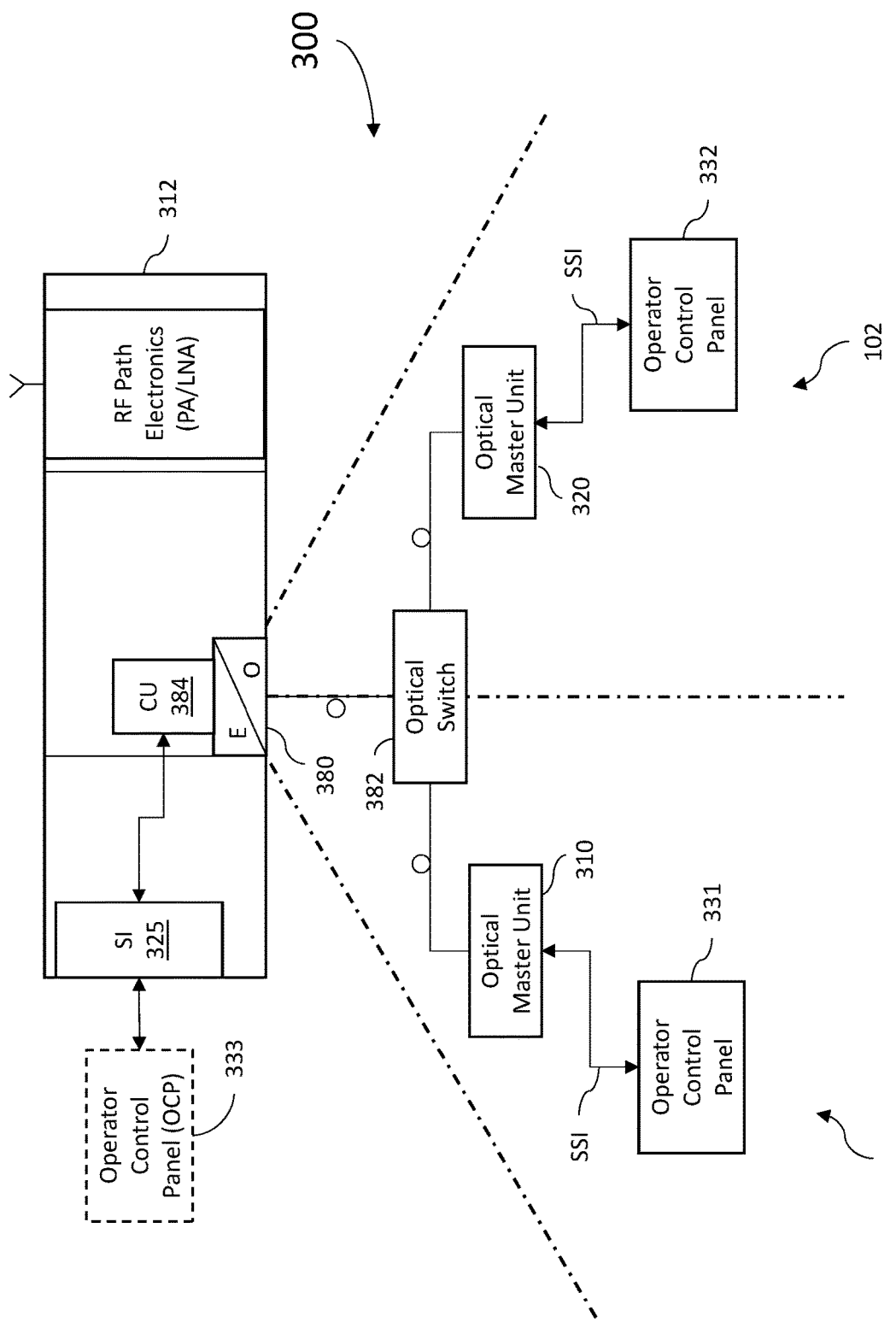
FIG. 4 is a block diagram illustrating another alternate implementation of an optical distributed antenna system of one embodiment of the present disclosure.

It should be appreciated that while the ORU 312 may include separate control units for each optical interface, and have those separate control units communicate with each other using bidirectional inter control unit communication (ICC), other implementation of ODAS 300 may instead comprise a single control unit within ORU 312 that accesses SSI packets communicated via either one or the optical interfaces 321 or 323 of the ORU 312. Furthermore, although the ORU 312 illustrated in FIG. 3 is shown as having two optical interfaces 321 and 323, as shown in FIG. 4, the ORU 312 may instead comprise a single optical interface 380 that is coupled to an optical switch 382 that may be controlled, for example by ORU control unit 384. The optical switch 382, in turn would be coupled to the separate fiber connections to the OMU 310 and OMU 320 and operable to toggle the single optical interface 380 between those separate fiber connections.

It should be appreciated that other ODAS system events such as an equipment status change not associated with an operator initiated action can also result in a change to the SSI that needs to be synchronized. For example, if OMU 310 loses part or all of its connectivity with a base station 140, an alarm may be generated at the affected OMU 310 that initiates a change in SSI at OCP 331. Other equipment malfunctions or operational anomalies in the ODAS may similarly generate alarms or status changes that initiate a change in SSI at OCP 331. In the same manner as the sequence described above for an operator initiated action, a change in SSI at OCP 331 due to alarms or other equipment status changes may initiate generation of an SSI packet that is communicated to the OMU 310 and from this action, SSI synchronization is initiated through the ORU 312.

Figure 3A:
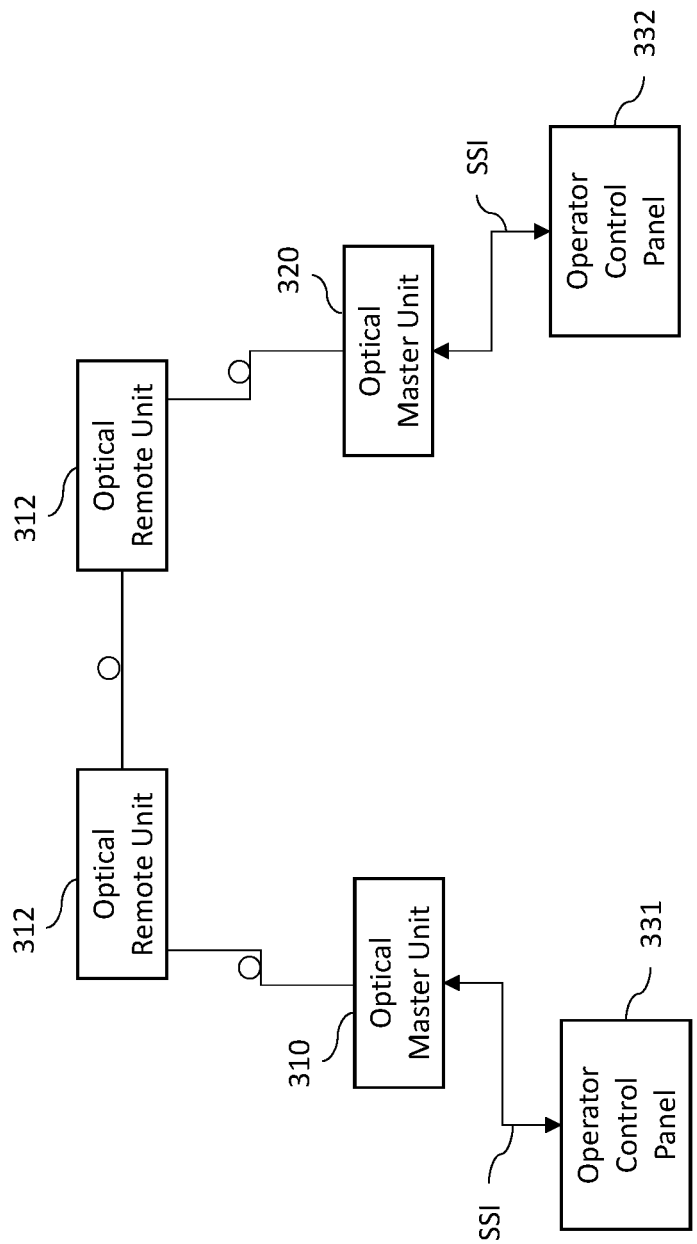
FIG. 3A is a block diagram illustrating an alternate implementation of an optical distributed antenna system of one embodiment of the present disclosure.

It should also be appreciated that other network architectures may be implemented that still functionally operate in the same manner as described in any of the embodiments described herein. For example, in one embodiment, in one alternate network architecture, as opposed to a single ORU 312 intervening between OMU 310 and OMU 320, there may be multiple daisy chained ORU 312 intervening between OMU 310 and OMU 320 as shown in the example of FIG. 3A. In that case, each intervening ORU 312 would merely function in the same manner as ORU 312 described above to forward SSI packets received from one of its fiber connections out through the other, and when present, send those OCP packets to its own OCP 333. It should be understood that for any of the embodiments described herein, while the communication links connecting master units and remote antenna units may comprise optical fiber, in other embodiments other wired or wireless communication links, or combinations thereof, may be utilized instead of, or in combination with, optical fiber communication links.

Furthermore, an ORU 312 is not necessarily limited to facilitating synchronizing SSI between just two ODAS domains, but may also facilitate synchronization of SSI between three or more domains, for example by including one or more additional control units and/or fiber interfaces that may communicate via ICC to one or both of the first or second control units 322 and 324.

As used herein, DAS related terms such as "master unit", "remote unit", "remote antenna unit" and "control unit" refer to hardware elements that would be immediately recognized and understood by those of skill in the art of wireless communications and are not used herein as nonce words or nonce terms for the purpose of invoking 35 USC 112(f).

Example Embodiments

Example 1 includes a distributed antenna system comprising: a master unit configured to receive a base station downlink radio frequency signal and to transmit a base station uplink radio frequency signal; and at least one remote antenna unit that is communicatively coupled to the master unit using at least one cable, the remote antenna unit configured to radiate a remote downlink radio frequency signal from at least one antenna associated with the remote antenna unit and to receive a remote uplink radio frequency signal from at least one antenna associated with the remote antenna unit; wherein the master unit comprises: a master unit controller; and a respective interface to couple the master unit controller to a first operator control panel; wherein the at least one remote antenna unit comprises: a remote unit controller; and a respective interface to couple the remote unit controller to a second operator control panel; wherein the master unit controller and the remote unit controller synchronize at least some information between the first operator control panel and the second operator control panel over the at least one cable.

Example 2 includes the system of example 1, wherein the master unit is configured to communicate a downlink transport signal from the master unit to the at least on remote antenna unit, wherein the downlink transport signal is derived from the base station downlink radio frequency signal received at the master unit; wherein the at least one remote antenna unit uses the downlink transport signal to generate the remote downlink radio frequency signal; wherein the remote antenna unit is configured to communicate an uplink transport signal from the at least one remote antenna unit to the master antenna unit, wherein the uplink transport signal is derived from the at least one remote uplink radio frequency signal received at the remote antenna unit; wherein the master unit uses the uplink transport signal to generate the base station uplink radio frequency signal.

Example 3 includes the system of any of examples 1-2, wherein the master unit is configured to communicate information to and from the first operator controller panel over the respective interface of the master unit; wherein the remote antenna unit is configured to communicate information to and from the second operator controller panel over the respective interface of the at least one remote antenna unit; and wherein at least some of the information communicated to or from the second operator controller panel over the respective interface of the at least one remote antenna unit is communicated from the master unit or to the master unit over the at least one cable.

Example 4 includes the system of any of examples 1-3, wherein the respective interface of the master unit is configured to couple the master unit controller to the first operator control panel via a first operator control panel cable; wherein the a respective interface of the at least one remote antenna unit is configured to couple the remote antenna unit controller to the second operator control panel via a second operator control panel cable.

Example 5 includes the system of any of examples 1-4, wherein the master unit controller is configured to periodically read a status of the various user input devices included in the first operator control panel; and wherein the remote antenna unit controller is configured to periodically read a status of the various user input devices included in the second operator control panel.

Example 6 includes the system of example 5, wherein when the master unit controller detects a status and setting information change in the first operator control panel, the status and setting information change is communicated over the at least one cable to the remote unit controller; and wherein the remote unit controller updates status and setting information in the second operator control panel based on the status and setting information change received over the at least one cable.

Example 7 includes the system of any of examples 5-6, wherein when the remote unit controller detects a status and setting information change in the second operator control panel, the status and setting information change is communicated over the at least one cable to the master unit controller; wherein the remote unit controller updates status and setting information in the first operator control panel based on the status and setting information change received over the at least one cable.

Example 8 includes the system of any of examples 1-7, wherein the first operator control panel and the second operator control panel each comprise a synchronization mechanism having a memory, wherein the synchronization mechanism controls the flow of status and setting information (SSI) packets transmitted from the operator control panel.

Example 9 includes the system of any of examples 1-8, wherein the respective interface comprises at least one digital input or digital output that communicates based on signal level control and signal edge control.

Example 10 includes a distributed antenna system, the system comprising: a first distributed antenna system domain comprising: a first master unit configured to communicate with one or more wireless communication system base stations; a first operator control panel coupled through a first bidirectional signal interface to the first master unit; a plurality of remote antenna units each coupled to the first master unit by at least one respective cable, wherein each of the remote antenna units are configured to receive downlink signals from the first master unit and radiate RF signals converted from the downlink signals, wherein each of the remote antenna units are configured to transmit signals to the first master unit converted from received wireless RF signals; a second distributed antenna system domain comprising: a second master unit configured to communicate with one or more wireless communication system base stations and coupled to at least a first remote antenna unit of the plurality of remote antenna units by a first cable; a second operator control panel coupled through a second bidirectional signal interface to the second optical master unit; wherein status and setting information (SSI) changes are synchronized between the first operator control panel and the second operator control panel by signals forwarded through the first remote antenna unit.

Example 11 includes the system of example 10, wherein the distributed antenna system comprises an optical distributed antenna system and the at least one respective cable comprises fiber optic cables.

Example 12 includes the system of any of examples 10-11, the first master unit further comprising: at least one interface coupled to the at least one respective fiber; a master unit control unit coupled to the first bidirectional signal interface, wherein the master unit control unit executes code to: detect status and setting information changes in the first operator control panel through the bidirectional signal interface; and when a status and setting information change is detected, generate an status and setting information package and transmit the status and setting information package through the at least one respective cable to the first remote antenna unit.

Example 13 includes the system of example 12, wherein the master unit control unit executes code to implement a polling technique to poll the first signal interface to detect the status and setting information change in the first operator control panel.

Example 14 includes the system of any of examples 10-13, the second master unit further comprising: a master unit control unit coupled to the bidirectional signal interface, wherein the master unit control unit executes code to: receive status and setting information packets from the first remote antenna unit; and update status and setting information in the second operator control panel via the second bidirectional signal interface.

Example 15 includes the system of example 14, wherein the master unit control unit executes code to implement a polling technique to detect when status and setting information packets are available to be received from the first remote antenna unit.

Example 16 includes the system of any of examples 10-15, further comprising: a third operator control panel coupled through a third bidirectional signal interface to the first remote antenna unit, wherein the status and information changes are synchronized between the first operator control panel, the second operator control panel, and the third operator control panel by the fiber optic signals forwarded through the first remote antenna unit.

Example 17 includes the system of example 16, the remote antenna unit further comprising: a remote antenna unit control unit coupled to the third bidirectional signal interface, wherein the remote antenna unit control unit executes code to: receive status and setting information packets from at least one of the first master unit or the second master unit; and update status and setting information in the third operator control panel via the third bidirectional signal interface.

Example 18 includes the system of any of examples 16-17, the first remote antenna unit further comprising: an remote antenna unit control unit coupled to the third bidirectional signal interface, wherein the remote antenna unit control unit executes code to: detect status and setting information changes in the third operator control panel through the third bidirectional signal interface; and when a status and setting information change is detected, generate a status and setting information package and transmit the status and setting information package through the to the first master unit and the second master unit.

Example 19 includes the system of any of examples 10-18, the first antenna unit further comprising: a first interface in communication with the first master unit; a second interface in communication with the second master unit; a first remote antenna unit control unit in communication with the first interface; and a second remote antenna unit control unit in communication with the second interface; wherein when a status and setting information package representing the status and setting information changes is received via the first interface, the first remote antenna unit control unit forwards the status and setting information package to the second remote antenna unit control unit, and the second remote antenna unit forwards the status and setting information package to the second interface.

Example 20 includes the system of any of examples 10-19, further comprising: an optical switch that includes a first optical interface in communication with the first master unit and a second optical interface in communication with the second master unit; the first antenna unit further comprising a third interface coupled to an remote antenna unit control unit, wherein a status and setting information package representing the status and setting information changes is received via the first interface, the remote antenna unit control unit forwards the status and setting information package to the second interface.

Example 21 includes the system of any of examples 10-20, wherein the first master unit is configured to communicate with a first wireless communication system base station of the one or more wireless communication system base stations; and wherein the second master unit is configured to communicate with a second wireless communication system base station of the one or more wireless communication system base stations.

Example 22 includes the system of any of examples 10-21, wherein the first master unit and the second master unit are both configured to communicate with a first wireless communication system base station of the one or more wireless communication system base stations.

Example 23 includes the system of any of examples 10-22, wherein the first operator control panel initiates updates to status and setting information based on at least one of operator actions or detected system status changes.

Example 24 includes the system of any of examples 10-23, wherein the status and setting information comprises at least one of: binary state information, system hardware status information, system software status information, or a status of equipment connected to the distributed antenna system.

Example 25 includes the system of any of examples 10-24, wherein the first operator control panel is powered from the first master unit.

Example 26 includes the system of any of examples 10-25, further comprising at least one intervening remote antenna unit coupled via optical fiber cables between the first remote antenna unit and the second master unit.

Example 27 includes the system of any of examples 10-26, wherein the first operator control panel and the second operator control panel each comprise a synchronization mechanism having a memory, wherein the synchronization mechanism controls the flow of status and setting information (SSI) packets transmitted from the respective operator control panel.

Example 28 includes the system of any of examples 10-27, wherein the first bidirectional signal interface comprises at least one digital input or digital output that communicates based on signal level control and signal edge control.

Example 29 includes a method for synchronizing status and setting information across Distributed Antenna System (DAS) domains, the DAS comprising a first master unit within a first DAS domain, a second master unit within a second DAS domain and at least a first remote antenna unit coupled to the first master unit and the second master unit, the method comprising: detecting a change in status and setting information in a first operator control panel coupled through a first bidirectional signal interface to the first master unit; when a status and setting information change is detected: generating at least one status and setting information package at the first master unit; transmitting the at least one status and setting information package to the first remote antenna unit through a first cable of the DAS; forwarding the at least one status and setting information package from the first remote antenna unit to the second optical master unit through a second cable of the DAS; updating status and setting information resident on a second control panel coupled to the second optical master unit through a second bidirectional signal interface.

Example 30 includes the method of example 29, further comprising: updating status and setting information resident on a third control panel coupled to the remote antenna interface through a third bidirectional signal interface.

Example 31 includes the method of any of examples 29-30, wherein detecting a change in status and setting information comprises polling the first bidirectional signal interface.

Example 32 includes the method of any of examples 29-31, further comprising: initiating a change in status and setting information at the first operator control panel based on at least one of operator actions or detected system status changes.

Example 33 includes the method of any of examples 29-32, wherein the status and setting information comprises at least one of: binary state information, system hardware status information, system software status information, or a status of equipment connected to the optical distributed antenna system.

Example 34 includes the method of any of examples 29-33, wherein the first operator control panel is powered from the first master unit.

Example 35 includes the method of any of examples 29-34, the DAS further comprising at least one intervening remote antenna unit coupled via optical fiber cables between the first remote antenna unit and the second master unit.

Example 36 includes a method for synchronizing status and setting information across a Distributed Antenna System (DAS), the DAS comprising a first master unit and at least a first remote antenna unit coupled to the first master unit via a cable, the method comprising: detecting a change in status and setting information in a first operator control panel coupled through a first bidirectional signal interface to the first master unit; wherein the master unit is configured to communicate a downlink transport signal from the master unit to the remote antenna unit, wherein the downlink transport signal is derived from a base station downlink radio frequency signal received at the master unit, wherein the first remote antenna unit uses the downlink transport signal to generate a remote downlink radio frequency signal, wherein the first remote antenna unit is configured to communicate an uplink transport signal from the first remote antenna unit to the master antenna unit, wherein the uplink transport signal is derived from an remote uplink radio frequency signal received at the remote antenna unit, and wherein the master unit uses the uplink transport signal to generate a base station uplink radio frequency signal; when a status and setting information change is detected: generating at least one status and setting information package at the first master unit; transmitting the at least one status and setting information package to the first remote antenna unit through the cable; and updating status and setting information resident on a second control panel coupled to the first remote antenna unit through a second bidirectional signal interface.

In various alternative embodiments, system and/or device elements, method steps, or example implementations described throughout this disclosure (such as any of the master units, remote antenna units, controllers, circuitry, control units or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A device for a distributed antenna system (DAS), the device comprising:
    downlink DAS circuitry configured to transmit a downlink signal carrying communications received by the DAS from one or more wireless communication system base stations in a downlink direction towards at least one antenna of the DAS;
    uplink DAS circuitry configured to transmit an uplink signal carrying communications received from the at least one antenna in an uplink direction towards the one or more wireless communication system base stations; and
    a controller configured to communicate with a first operator control panel via a cable;
    wherein the controller is configured to synchronize status and setting information (SSI) changes between the first operator control panel and a second operator control panel via signals communicated over the DAS with at least one of the downlink signal and the uplink signal.

2. The device of claim 1, wherein the controller is configured to periodically read a status of one or more user input devices included in the first operator control panel.

3. The device of claim 2, wherein the controller is configured to detect changes in the status of the one or more user input devices included in the first operator control panel and communicate the changes to the second operator control panel.

4. The device of claim 2, wherein the controller is configured to detect changes in the status of the one or more user input devices included in the first operator control panel and communicate the changes to an operator control panel system manager.

5. The device of claim 1, wherein the controller is configured to update status and setting information in the first operator control panel based on status and setting information change received over the DAS from the second operator control panel.

6. The device of claim 1, wherein the first operator control panel and the second operator control panel each comprise a synchronization mechanism having a memory, wherein the synchronization mechanism controls the flow of status and setting information (SSI) packets transmitted from the respective operator control panel.

7. The device of claim 1, wherein the device further comprises an operator control panel cable interface configured to couple the controller to the first operator control panel via the cable.

8. The device of claim 7, wherein the operator control panel cable interface comprises at least one digital input or digital output that communicates based on one or both of signal level control and signal edge control.

9. The device of claim 1, wherein the controller is configured to change a state of one or more user output devices of the first operator control panel based on received SSI from the second operator control panel.

10. The device of claim 1, wherein the control unit is configured to transmit outgoing SSI packets to the second operator control panel and receive incoming SSI packets from the second operator control panel over at least one fiber optic cable.

11. The device of claim 1, wherein the device is either a remote antenna unit of the DAS or a master unit of the DAS.

12. The device of claim 1, wherein the controller is configured to communicate the SSI changes between the first operator control panel and the second operator control panel through a master unit of the DAS.

13. The device of claim 1, wherein the controller is configured to communicate the SSI changes between the first operator control panel and the second operator control panel through a remote antenna unit of the DAS.

14. A method for synchronizing status and setting information across a distributed antenna system (DAS), the method comprising:
    monitoring for a change in status and setting information in a first operator control panel coupled to a first device of the DAS, wherein the first device is configured to transmit a downlink signal carrying communications received by the DAS from one or more wireless communication system base stations in a downlink direction towards at least one antenna of the DAS and to transmit an uplink signal carrying communications received from the at least one antenna in an uplink direction towards the one or more wireless communication system base stations;
    detecting a status and setting information (SSI) change; and
    when the status and setting information change is detected, synchronizing the SSI change between the first operator control panel and a second operator control panel via signals communicated over the DAS with at least one of the downlink signal and the uplink signal.

15. The method of claim 14, further comprising updating status and setting information in the first operator control panel based on the status and setting information change received over the DAS from the second operator control panel.

16. The method of claim 15, further comprising updating a state of one or more user output devices of the first operator control panel based on received SSI from the second operator control panel.

17. The method of claim 14, further comprising:
    transmitting outgoing SSI packets to the second operator control panel over at least one fiber optic cable, and
    receiving incoming SSI packets from the second operator control panel over the at least one fiber optic cable.

18. The method of claim 14, wherein the first device is either a remote antenna unit of the DAS or a master unit of the DAS.

19. The method of claim 14, wherein the synchronizing the SSI change between the first operator control panel and the second operator control panel further comprises communicating the SSI change through a master unit of the DAS.

20. The method of claim 14, wherein the synchronizing the SSI change between the first operator control panel and the second operator control panel further comprises communicating the SSI change through a remote antenna unit of the DAS.

* * * * *